(12) United States Patent
Matsunaga

(10) Patent No.: US 9,858,507 B2
(45) Date of Patent: Jan. 2, 2018

(54) PRINTING CONTROL DEVICE AND PRINTING CONTROL METHOD

(71) Applicant: SEIKO EPSON CORPORATION, Tokyo (JP)

(72) Inventor: Hirotaka Matsunaga, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/828,941

(22) Filed: Aug. 18, 2015

(65) Prior Publication Data
US 2016/0065790 A1 Mar. 3, 2016

(30) Foreign Application Priority Data
Aug. 29, 2014 (JP) .................. 2014-174701

(51) Int. Cl.
H04N 1/60 (2006.01)
G06K 15/02 (2006.01)
G06K 15/10 (2006.01)
H04N 1/40 (2006.01)

(52) U.S. Cl.
CPC ......... *G06K 15/102* (2013.01); *H04N 1/6013* (2013.01); *H04N 1/40012* (2013.01)

(58) Field of Classification Search
CPC ...... H04N 1/6058; H04N 1/46; H04N 1/6008; G06K 15/102; G06K 15/1878
USPC ........................ 358/1.9, 3.01, 1.15
See application file for complete search history.

(56) References Cited

U.S. PATENT DOCUMENTS

| 2002/0054324 | A1* | 5/2002 | Okada | G06Q 20/12 358/1.15 |
| 2006/0114529 | A1* | 6/2006 | Oh | G06K 15/005 358/527 |
| 2006/0215227 | A1* | 9/2006 | Kakutani | H04N 1/40087 358/3.01 |
| 2006/0285134 | A1* | 12/2006 | Viturro | G03G 15/01 358/1.9 |
| 2012/0002994 | A1* | 1/2012 | Moroney | G03G 15/5016 399/72 |

FOREIGN PATENT DOCUMENTS

JP 2012-000918 A 1/2012

* cited by examiner

Primary Examiner — Quang N Vo
(74) Attorney, Agent, or Firm — Global IP Counselors, LLP

(57) ABSTRACT

A printing control device performs control to convert an input image with reference to a color conversion table that specifies a correspondence relationship between an input coordinate value and an amount of printing coloring material used, and to print an output image after the conversion. The printing control device includes a list printing control unit which performs control to print a list of images based on the input image for adjusting the color conversion table with reference to a list printing color conversion table that has a structure different from the color conversion table.

13 Claims, 11 Drawing Sheets

| | INPUT COORDINATE VALUE 8 bit | | | OUTPUT COORDINATE VALUE 16 bit (THE NUMBER OF GRADATIONS G2) | | | | | |
|---|---|---|---|---|---|---|---|---|---|
| | EQUIVALENT TO BRIGHTNESS | EQUIVALENT TO a* | EQUIVALENT TO b* | | | | | | |
| | R | G | B | C | M | Y | K | Lk | |
| N2 POINTS | 0 | 0 | 0 | | | | | | R1 |
| | 16 | 0 | 0 | | | | | | |
| | 32 | 0 | 0 | (a*,b* MINUS DIRECTION ADJUSTMENT MAXIMUM) | | | | | |
| | ⋮ | ⋮ | ⋮ | | | | | | |
| | 224 | 0 | 0 | | | | | | |
| | 240 | 0 | 0 | | | | | | |
| | 255 | 0 | 0 | | | | | | |
| | ⋮ | ⋮ | ⋮ | ⋮ | ⋮ | ⋮ | ⋮ | ⋮ | |
| N2 POINTS | 0 | 0 | 255 | | | | | | R2 |
| | 16 | 0 | 255 | (a* MINUS DIRECTION, b* PLUS DIRECTION ADJUSTMENT MAXIMUM) | | | | | |
| | ⋮ | ⋮ | ⋮ | | | | | | |
| | 240 | 0 | 255 | | | | | | |
| | 255 | 0 | 255 | | | | | | |
| | ⋮ | ⋮ | ⋮ | ⋮ | ⋮ | ⋮ | ⋮ | ⋮ | |
| N2 POINTS | 0 | 128 | 128 | 0 | 0 | 0 | 255 | 0 | R3 |
| | 16 | 128 | 128 | (FOR CENTER IMAGE) | | | | | |
| | 32 | 128 | 128 | | | | | | |
| | ⋮ | ⋮ | ⋮ | ⋮ | ⋮ | ⋮ | ⋮ | ⋮ | |
| | Rj | Gj | Bj | Cj | Mj | Yj | Kj | Lkj | |
| | ⋮ | ⋮ | ⋮ | ⋮ | ⋮ | ⋮ | ⋮ | ⋮ | |
| | 224 | 128 | 128 | | | | | | |
| | 240 | 128 | 128 | | | | | | |
| | 255 | 128 | 128 | 0 | 0 | 0 | 0 | 0 | |
| | ⋮ | ⋮ | ⋮ | ⋮ | ⋮ | ⋮ | ⋮ | ⋮ | |
| N2 POINTS | 0 | 255 | 0 | | | | | | R4 |
| | 16 | 255 | 0 | (a* PLUS DIRECTION, b* MINUS DIRECTION ADJUSTMENT MAXIMUM) | | | | | |
| | ⋮ | ⋮ | ⋮ | | | | | | |
| | 240 | 255 | 0 | | | | | | |
| | 255 | 255 | 0 | | | | | | |
| | ⋮ | ⋮ | ⋮ | ⋮ | ⋮ | ⋮ | ⋮ | ⋮ | |
| N2 POINTS | 0 | 255 | 255 | | | | | | R5 |
| | 16 | 255 | 255 | (a*,b* PLUS DIRECTION ADJUSTMENT MAXIMUM) | | | | | |
| | ⋮ | ⋮ | ⋮ | | | | | | |
| | 240 | 255 | 255 | | | | | | |
| | 255 | 255 | 255 | | | | | | |

↑ 321    322

PRINTING CONTROL DEVICE AND PRINTING CONTROL METHOD

CROSS-REFERENCE TO RELATED APPLICATIONS

This application claims priority to Japanese Patent Application No. 2014-174701 filed on Aug. 29, 2014. The entire disclosure of Japanese Patent Application No. 2014-174701 is hereby incorporated herein by reference.

BACKGROUND

1. Technical Field

The present invention relates to a printing control device which refers to a color conversion table, and a printing control method.

2. Related Art

An image formation device such as a printer or a host device such as a personal computer performs control to color-convert an input image with reference to a color conversion table, and to print the image after color conversion. The color conversion table specifies, for example, a correspondence relationship between an input coordinate value of a RGB (Red, Green, Blue) color system that depends on a monitor and an amount of use of an ink (coloring material) of CMYK (cyan, magenta, yellow, black) that is used in the printer. The color conversion table is used in color conversion of gray images in which input coordinate values of RGB are the same. In order to check a subtle color of a monochrome image, it is considered to test-print a monochrome image whose color is subtly changed.

The image formation system disclosed in JP-A-2012-918 is not intended to print a monochrome image, but accepts a setting of a plurality of test color conversion tables, prints a plurality of test output images by applying each of the test color conversion tables, and uses a selected test color conversion table as a regular version of a color conversion table. Therefore, the test color conversion table and the regular version of the color conversion table have the same number of grid points, and the same number of gradations of an output value to be stored.

In order to improve an image quality of a monochrome image, it is necessary to provide a color conversion table which has large number of grid points or large number of output gradations. On the other hand, when performing list printing on test images having a subtle difference in color, providing a color conversion table which has large number of grid points or large number of output gradations for each test image requires a very large memory size for control processing on the list printing.

The problem described above is present not only in a technology of color-converting an input image of a RGB color system into an image of a CMYK color system to print, but also in other various types of technologies.

SUMMARY

An advantage of some aspects of the invention is to provide a technology which is capable of reducing a memory size to store list printing color conversion tables.

According to an aspect of the invention, there is provided a printing control device which performs control to convert an input image with reference to a color conversion table that specifies a correspondence relationship between an input coordinate value and an amount of printing coloring material used and to print an output image after the conversion, the device including a list printing control unit which performs control to print a list of images based on the input image for adjusting the color conversion table with reference to a list printing color conversion table that has a structure different from the color conversion table.

According to the aspect, a technology capable of reducing a memory size required for control processing on list printing can be provided.

Furthermore, the invention can be applied to a complex device such as a printer which includes an image formation device and a printing control device, a processing method for the complex device which includes an image formation method, and a printing control method, having a process corresponding to each of the units described above, a processing program for the complex device which includes an image formation program, and a printing control program causing a computer to realize a function corresponding to each of the units described above, a computer-readable medium which records these programs, a color conversion table, and the like. The device described above may be configured to have a plurality of separated parts.

BRIEF DESCRIPTION OF THE DRAWINGS

The invention will be described with reference to the accompanying drawings, wherein like numbers reference like elements.

FIG. 5 is a diagram which schematically shows a structural example of a list printing color conversion table.

DESCRIPTION OF EXEMPLARY EMBODIMENTS

Hereinafter, embodiments of the invention will be described. Of course, following embodiments are merely exemplifications of the invention, and all of features shown in the embodiments are not limited to being essential to solution means of the invention.

1. Outline of the Technology

First, an outline of the technology will be described referring to FIGS. 1 to 11.

Figure 2:
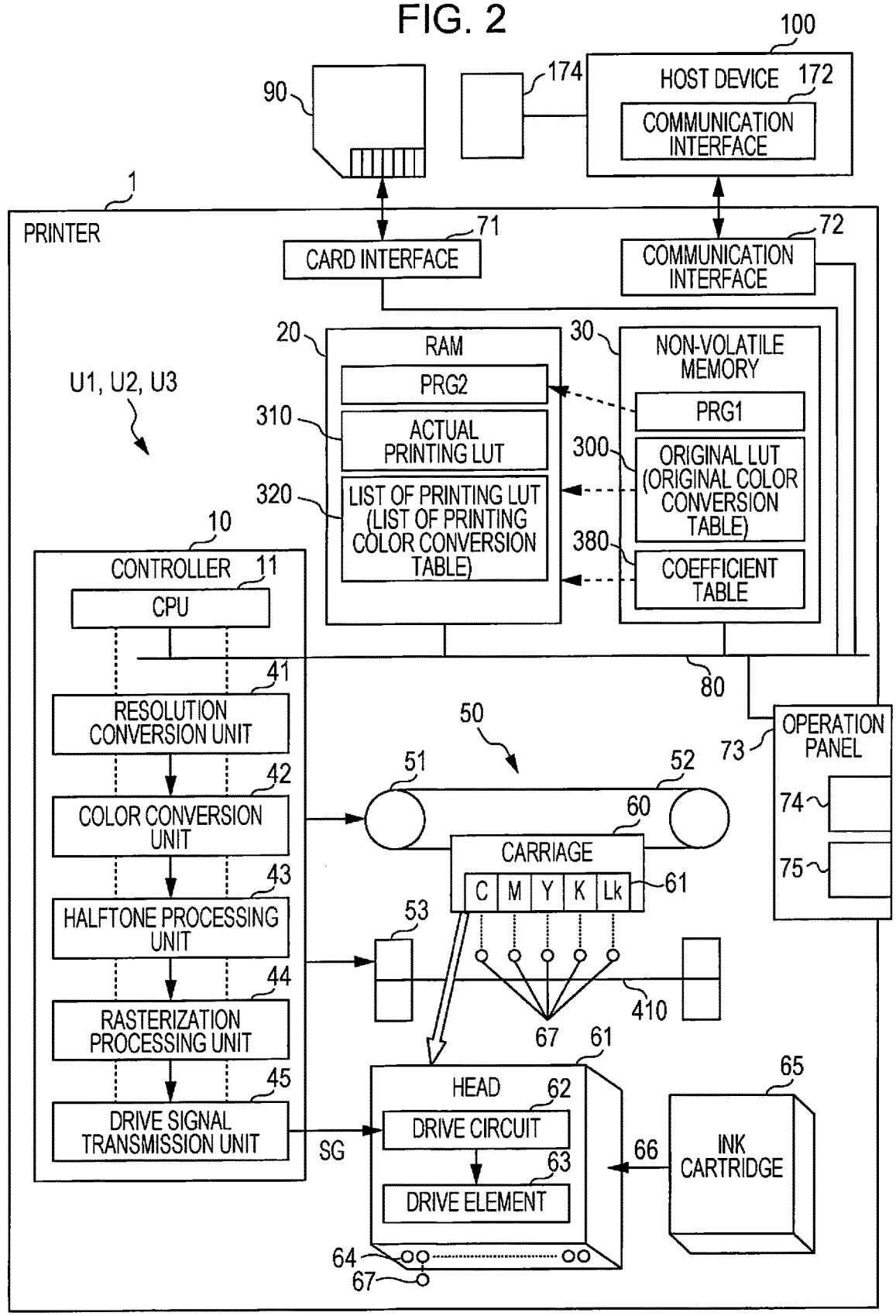
FIG. 2 is a diagram which schematically shows a configuration example of a printer.
Figure 3:
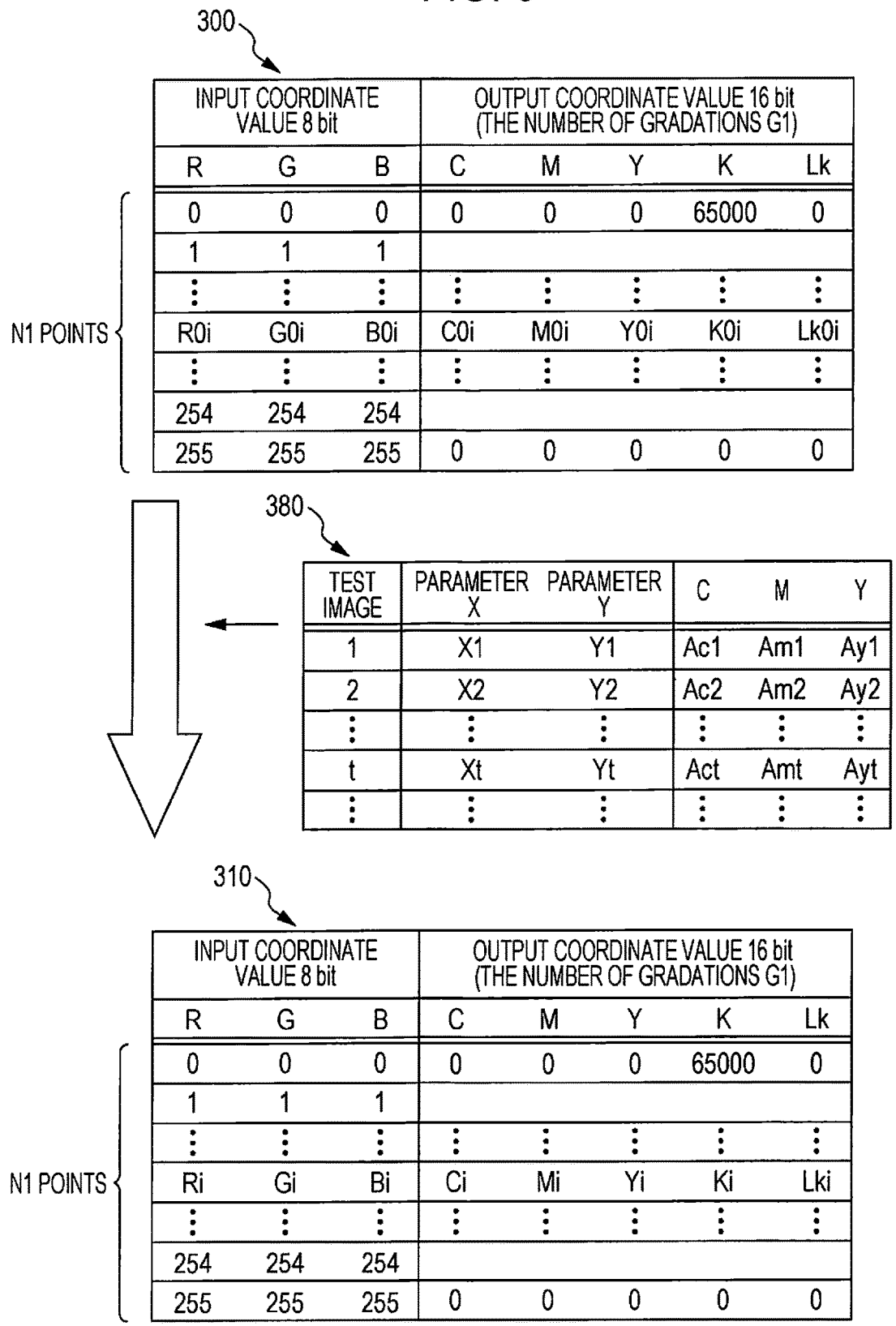
FIG. 3 is a diagram which schematically shows structural examples of an original color conversion table, a color conversion table, and a coefficient table.

A printing control device shown in FIG. 2 and the like performs control to convert an input image D1 with reference to a color conversion table 310 which specifies a correspondence relationship between an input coordinate value (for example, a gradation value Ri, Gi, or Bi of RGB shown in FIG. 3) and the amount of printing coloring material (for example, ink 66) used (for example, a gradation value Ci, Mi, Yi, Ki, or Lki of CMYKLk), and to print an output image D5 after the conversion. Here, Lk is light black which is achromatic with a lower concentration than K. The printing control device includes a list printing control unit U1 which performs control to print a list of images D3 based on the input image D1 for adjusting the color conversion table 310 with reference to a list printing color conversion table 320 that has a structure different from the color conversion table 310.

In this technology, since the list of images D3 for adjusting a color conversion table is printed with reference to the list printing color conversion table 320 that has a structure different from the color conversion table 310 to be used in actual printing, it is possible to reduce a memory size required for control processing on list printing.

Here, the color conversion table is different from the list printing color conversion table in structure in that the number of grid points along a coordinate axis of an input color system is different, the number of gradations in an amount of coloring material used is different, and the list printing color conversion table has information which the color conversion table does not have.

Incidentally, as exemplified in FIGS. 3 and 5, the number N2 of grid points along a coordinate axis (for example, R axis, G axis, and B axis) of an input color system (for example, RGB color system) in the list printing color conversion table 320 may be less than the number N1 of grid points along a coordinate axis of an input color system in the color conversion table 310. A case that N2 is equal to or greater than N1 is also included in the technology, but when N2 is less than N1, the number of grid points in the list printing color conversion table 320 is reduced, such that it is possible to reduce a memory size for storing the list printing color conversion table 320.

In addition, the number of gradations G2 in an amount of coloring material used in the list printing color conversion table 320 may be less than the number of gradations G1 in an amount of coloring material used in the color conversion table 310. A case that G2 is equal to or greater than G1 is also included in the technology, but when G2 is less than G1, a data amount of an amount of printing coloring material used specified in the list printing color conversion table 320 is small, such that it is possible to reduce the memory size for storing the list printing color conversion table 320.

As exemplified in FIG. 5, a plurality of components which configure the input color system in the list printing color conversion table 320 may include a brightness component 321 corresponding to brightness, and a color component 322 corresponding to color to be adjusted. The list printing control unit U1 may perform control to generate a list of images before the conversion D2 which is a list of images D2a that have different color components 322 based on the input image D1, to convert the list of images before the conversion D2 with reference to the list printing color conversion table 320, and to print a list of images after the conversion D3. The list of images before conversion D2 can be collectively converted with reference to the list printing color conversion table 320 in the embodiment, such that it is possible to speed up control processing on list printing.

Here, the color component includes a component corresponding to at least one of hue and saturation, a component corresponding to a gamma characteristic, a component corresponding to contrast, and the like.

A correspondence relationship between the brightness component 321 and the amount of use of coloring material in the list printing color conversion table 320 may be generated based on a correspondence relationship in the color conversion table 310. It is possible to improve color accuracy of a list of monochrome images in the embodiment.

The printing control device may further include a color conversion table adjusting unit U3 which receives an amount of color adjustment of the output image D5, and adjusts the original color conversion table 300 which specifies a correspondence relationship between an input coordinate value (for example, a gradation value R0i, G0i, or B0i of RGB shown in FIG. 3) and an amount of printing coloring material used (for example, a gradation value C0i, M0i, Y0i, K0i, or Lk0i) based on the received amount of adjustment to generate the color conversion table 310. Since the color conversion table is adjusted by inputting an amount of color adjustment of an output image in the embodiment, it is possible to reduce the memory size required for printing control processing.

An input coordinate value specified in the color conversion table 310 may be a value corresponding to brightness. A coloring material whose amount of use is specified in the color conversion table 310 and the list printing color conversion table 320 may include a chromatic coloring material (for example, inks of CMY). It is possible to provide a printing control device suitable for printing a list of monochrome images in the embodiment.

According to an aspect of the technology, there is provided a printing control device, including a list image formation unit which forms the list of images D3 based on the input image D1 for adjusting the color conversion table 310 with reference to the list printing color conversion table 320 that has a different structure from the color conversion table 310, as an image formation device which forms an output image from the input image D1 with reference to the color conversion table 310 that specifies the correspondence relationship between an input coordinate value and the amount of printing coloring material used.

According to another aspect of the technology, there is provided a printing control method, including forming the list of images D3 based on the input image D1 for adjusting the color conversion table 310 with reference to the list printing color conversion table 320 which has a different structure from the color conversion table 310, as an image formation method which forms an output image from the input image D1 with reference to the color conversion table 310 that specifies the correspondence relationship between an input coordinate value and the amount of printing coloring material used.

Since the list of images D3 for adjusting a color conversion table is formed with reference to the list printing color conversion table 320 which has a structure different from the color conversion table 310 used in actual printing in these aspects, it is possible to reduce the memory size required for control processing on a formation of a list of images.

Here, the formation of a list of images includes printing a list of images, displaying the list of images on a display device, and the like. Of course, formation of an output image includes printing the output image, displaying the output image on a display device, and the like.

Figure 1:
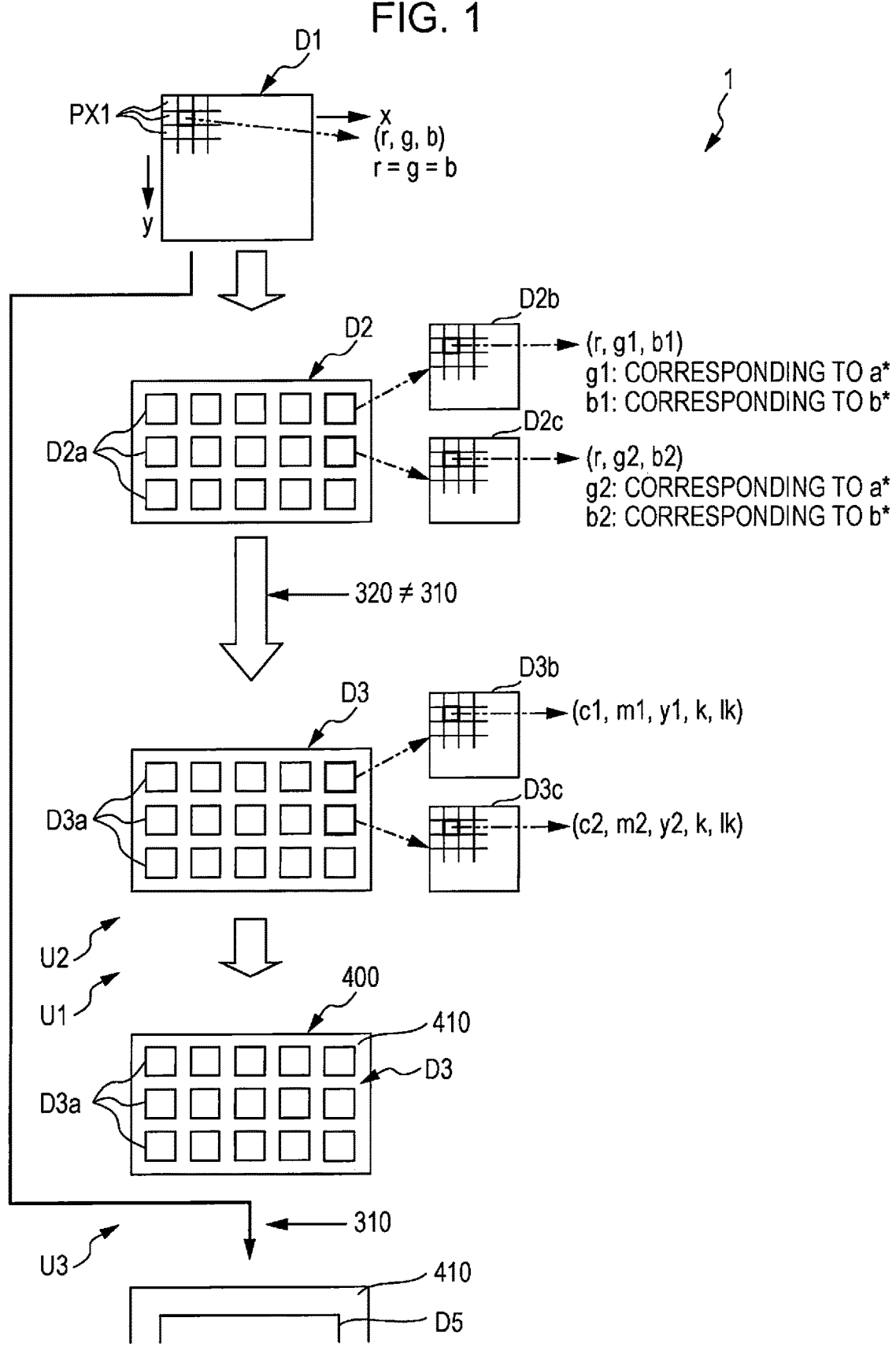
FIG. 1 is a diagram which schematically shows an example of forming an actual printing image after forming a printed material with a list of images based on an input image.

2. A Specific Example of a Configuration of a Printer Including a Printing Control Device and an Image Formation Device FIG. 1 schematically shows an example of forming an actual monochrome output image D5 on a print substrate 410 after forming a printed material 400 with the list of images D3 based on the input image D1. FIG. 2 schematically shows a configuration example of a serial printer which is a type of ink jet printer as a printer 1 that includes a printing control device and an image formation device. Of course, an ink jet printer to which the technology is applicable may be a line printer or the like. A printer to which the technology is applicable may be a printer of an electrophotographic system or the like such as a laser printer, and may be a copy machine, a facsimile, a multifunctional machine equipped with these functions, or the like. A monochrome image may be formed by an achromatic ink, but a variety of colors are represented by a combination of chromatic inks. The monochrome image includes a monochrome image of a sepia tone, a monochrome image of warm tone, a monochrome image of cool tone, and the like.

The list printing control unit U1 which performs control to form lists of images D2 and D3 from an input image D1 and to cause a mechanism section 50 to print the list of images D3 configures a basic portion of the printing control device of the technology. In addition, the list image formation unit U2 which generates a list of images D2 before color conversion from the input image D1 and converts colors of the list of images D2 to form a list of images D3 configures a basic portion of the image formation device of the technology.

In the printer 1 shown in FIG. 2, a controller 10, a random access memory (RAM) 20, a non-volatile memory 30, a mechanism section 50, interfaces (I/F) 71 and 72, an operation panel 73, and the like are connected to a bus 80, and can input or output information to or from each other.

A controller 10 includes a central processing unit (CPU) 11, a resolution conversion unit 41, a color conversion unit 42, a halftone processing unit 43, a rasterization processing unit 44, a drive signal transmission unit 45, and the like. The controller 10 can be configured by a system on chip (SoC) and the like.

The CPU 11 is a device which mainly performs information processing and control in the printer 1.

The resolution conversion unit 41 converts a resolution of an image received from a host device 100, a memory card 90, or the like into a set resolution. An image to be converted is represented by RGB data which have an integer value of 256 gradations of RGB (red, green, blue) such as, for example, a component of sRGB color system in each pixel. The input image D1 shown in FIG. 1 is set to be an image before color conversion whose resolution is converted. Pixels PX1 are aligned in x and y directions which are orthogonal to each other (different) in the input image D1, and gradation values (r, g, b) are stored in each of the pixels PX1. When the input image D1 is a gray image, r, g, and b are set to be the same as each other. As internal processing, a gradation value r of R, a gradation value g of G, and a gradation value b of B do not need to be stored in each of the pixels PX1, but any one of the gradation values r, g, and b may be stored in each of the pixels PX1 as a gradation value corresponding to brightness. Here, brightness is defined as brightness L* which configures, for example, international commission on illumination (CIE) L*a*b* color space.

The color conversion unit 42 converts RGB data of the set resolution into CMYKLk data which have gradation values of CMYKLk in each pixel with reference to an actual printing color conversion table (LUT) 310. Hereinafter, the color conversion table may be described simply as a look-up table (LUT).

The halftone processing unit 43 performs predetermined halftone processing such as a dither method, an error diffusion method, or a concentration pattern method on gradation values of each of pixels that configure CMYKLk data to reduce the number of gradations of the gradation values, and generate halftone data. The halftone data are data which represent a formation state of dots, may be binary data which represent the presence or absence of dot formation, or may be multi-level data of three or more gradations which can correspond to dots of various sizes such as dots of large, medium, and small sizes.

A rasterization processing unit 44 performs rasterization processing of rearranging half-tone data in an order in which dots are formed in the mechanism section 50 to generate raster data (image data of a path unit).

The drive signal transmission unit 45 generates a drive signal SG corresponding to a voltage signal applied to a drive element 63 of a head 61 from raster data and outputs the drive signal to a drive circuit 62. For example, when the raster data is "large dot formation", the drive signal transmission unit outputs a drive signal for discharging ink droplets for a large dot, and when the raster data is "small dot formation", the drive signal transmission unit outputs a drive signal for discharging ink droplets for a small dot.

Each of the units 41 to 45 described above may be configured by an application specific integrated circuit (ASIC), and may directly read data to be processed from the RAM 20 or may directly write the processed data in the RAM 20.

The mechanism section 50 which is controlled by the controller 10 includes a carriage motor 51, a sheet feeding mechanism 53, a carriage 60, a head 61, and the like. The carriage motor 51 allows the carriage 60 to reciprocate through a plurality of gears and a belt 52 (not shown). The sheet feeding mechanism 53 transports a print substrate 410 in a sheet feeding direction which is different from a moving direction of the carriage. The head 61 which discharges an ink droplet (liquid droplet) 67 of, for example, CMYKLk is mounted onto the carriage 60. The head 61 includes a drive circuit 62, a drive element 63, and the like. The drive circuit 62 applies a voltage signal to the drive element 63 according to a drive signal SG input from the controller 10. It is possible to use a piezoelectric element which applies pressure to an ink (liquid) 66 in a pressure chamber communicating with a nozzle 64, and a drive element which generates a bubble in the pressure chamber using heat to discharge an ink droplet 67 from the nozzle 64, and the like as the drive element 63. The ink 66 is supplied to the pressure chamber of the head 61 from the ink cartridge (liquid cartridge) 65. A combination of the ink cartridge 65 and the head 61 is provided for, for example, each of CMYKLk. The ink 66 in the pressure chamber is discharged from the nozzle 64 to the print substrate 410 as the ink droplet 67 by the drive element 63, and a dot of the ink droplet 67 is formed on the print substrate 410. The plurality of nozzles 64 and the print substrate 410 are relatively moved, and thereby the output image D5 corresponding to the input image D1 is formed on the print substrate 410.

The print substrate is a material which holds a printed image. A shape thereof is generally rectangular, but can be circular (for example, an optical disk such as CD-ROM or DVD), triangular, square, polygonal, and the like. The print substrate includes at least all varieties and processed products of sheets and paperboards described in Japanese Industrial Standard (JIS) P0001:1998 (sheet, paperboard, and pulp terms). A resin sheet, a metal plate, a three-dimensional object, and the like are included in the print substrate.

A program PRG2 which is developed from program data PRG1, an actual printing LUT 310, a list printing LUT (list printing color conversion table) 320, and the like are stored in the RAM 20. The program PRG2 includes a program to cause the printer 1 to realize a list printing control function corresponding to the list printing control unit U1, a list of images formation functions corresponding to the list image formation unit U2, and a LUT adjustment function corresponding to a LUT adjusting unit (color conversion table adjusting unit) U3.

The program data PRG1, an original LUT (original color conversion table) 300, a coefficient table 380, and the like are stored in the non-volatile memory 30. A read only memory (ROM), a magnetic recording medium such as a hard disk, and the like are used for the non-volatile memory 30. Development of the program data PRG1 means writing the program data in the RAM 20 as a program which can be interpreted by the CPU 11.

A card I/F 71 is a circuit which writes data in a memory card 90 or reads data from the memory card 90. The memory card 90 is a non-volatile semiconductor memory which can write and erase data, and an image and the like photographed by a photographing apparatus such as a digital camera are stored therein. An image is represented by a pixel value in, for example, a RGB color space, and each pixel value of RGB is represented by a 8-bit gradation value of, for example 0 to 255.

A communication I/F 72 is connected to a communication I/F 172 of the host device 100, and input or output information with respect to the host device 100. A universal serial bus (USB) and the like can be used for the communication I/Fs 72 and 172. The host device 100 includes a computer such as a personal computer, a digital camera, a digital video camera, a mobile phone such as smart phone, and the like.

The operation panel 73 includes an output unit 74, an input unit 75, and the like, and a user can input various types of instructions such as a setting of whether to perform color printing or to perform monochrome printing on an image to the printer 1. The output unit 74 is configured to have a liquid crystal panel (display unit) that displays, for example, information corresponding to various types of instructions or information indicating a state of the printer 1. The output unit 74 may perform an audio output on the information. The input unit 75 is configured to have operation keys such as a cursor key and a determination key (operation input unit). The input unit 75 may be a touch panel and the like which receives an operation to a display screen.

FIG. 3 schematically shows an example of generating an actual printing LUT 310 from the original LUT 300 with reference to the coefficient table 380. When finely adjusting a color such as chromaticity (hue and saturation), gamma characteristics, and contrast, a huge memory size is required so as to prepare the actual printing LUT in advance according to the adjustment of color. Therefore, the actual printing LUT 310 is generated from the original LUT 300 according to the adjustment of color in the specific example. Specific numerical values shown in the LUTs 300 and 310 of FIG. 3 are not more than examples.

The LUTs 300 and 310 specify a correspondence relationship between the input coordinate value and the amount of ink used for printing with respect to each grid point. The LUTs 300 and 310 shown in FIG. 3 are data tables for printing a monochrome image, and each component of the RGB color system which is an input color system has the same value. Accordingly, the LUTs 300 and 310 are substantially one-dimensional data tables. A LUT for printing a color image is generally a three-dimensional data table, and the number of grid points along a coordinate axis (R axis, G axis, and B axis) of the RGB color system is set to be less than the number of gradations of the input coordinate value so as to reduce a data size. In the one-dimensional LUTs 300 and 310, the number N1 of grid points is matched with the number of gradations of the input coordinate value (for example, 256 that can be expressed by 8 bits) so as to improve an image quality of a monochrome image to be formed. Accordingly, color conversion can be performed with reference to the actual printing LUT 310 without performing an interpolation operation, and high gradation and fast processing become possible. In addition, the number of gradations G1 of an output coordinate value corresponding to the amount of use of an ink in the LUTs 300 and 310 is set to be the number of gradations (for example, about 65000 that can be expressed by 16 bits) which is larger than the number of gradations (for example, 256) of an output coordinate value in the color image printing LUT. Accordingly, this allows color adjustment with high accuracy.

The original LUT 300 specifies a correspondence relationship between input coordinate values $R0i$, $G0i$, and $B0i$, and output coordinate values $C0i$, $M0i$, $Y0i$, $K0i$, and $Lk0i$. Here, i is an integer of 0 to 255. As internal processing, a data table which stores the output coordinate values $C0i$, $M0i$, $Y0i$, $K0i$, and $Lk0i$ in an address corresponding to any one of $R0i$, $G0i$, and $B0i$ may be set to be the original LUT 300.

The actual printing LUT 310 specifies a correspondence relationship between input coordinate values $Ri$, $Gi$, and $Bi$ and output coordinate values $Ci$, $Mi$, $Yi$, $Ki$, and $Lki$. As internal processing, a data table which stores the output coordinate values $Ci$, $Mi$, $Yi$, $Ki$, and $Lki$ in an address corresponding to any one of $Ri$, $Gi$, and $Bi$ may be set to be the LUT 310. In the specific example, $Ki$ is set to be equal to $K0i$ and $Lki$ is set to be equal to $Lk0i$ by generating only chromatic output coordinate values $Ci$, $Mi$, and $Yi$ when generating the actual printing LUT 310 based on the original LUT 300.

Figure 4:
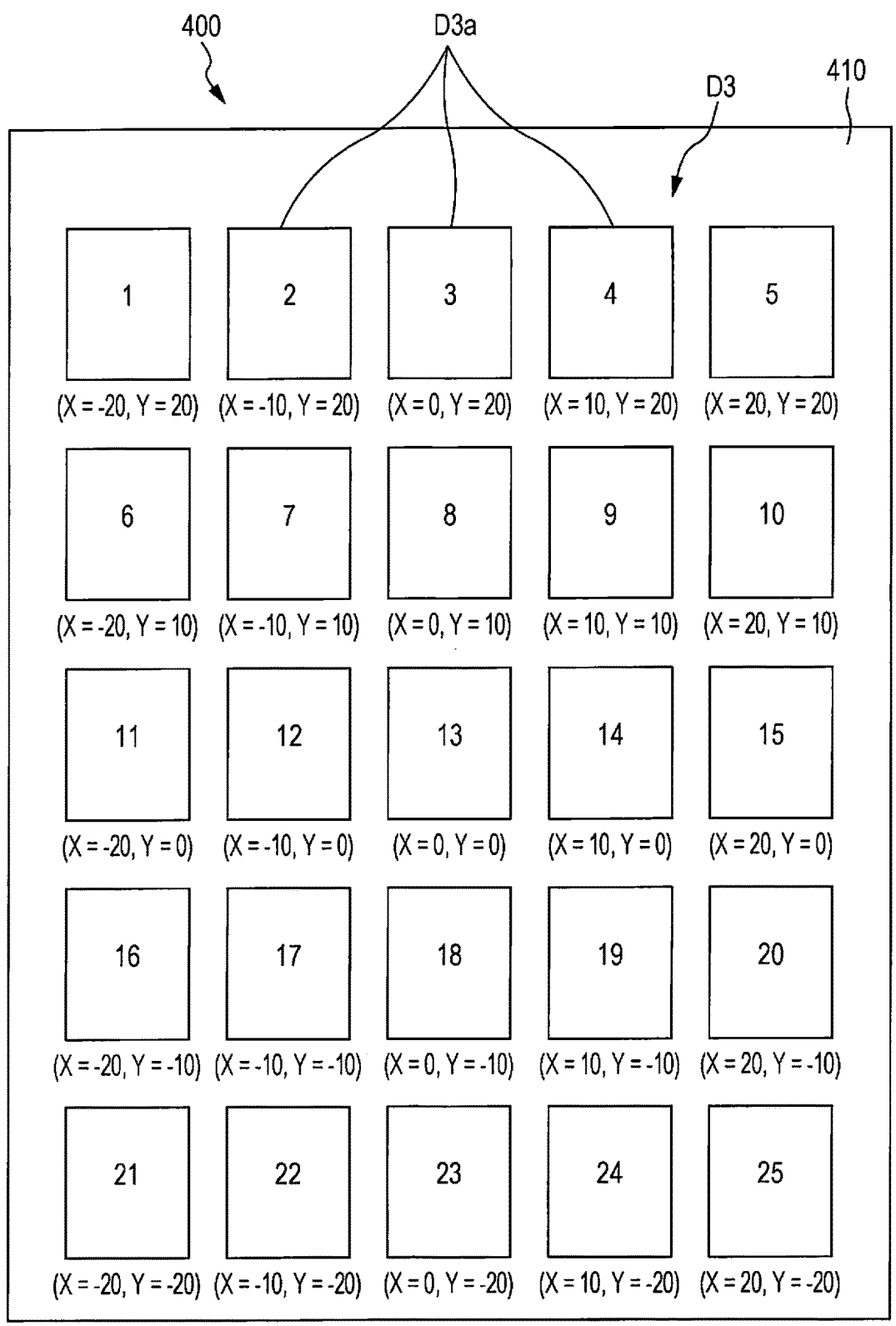
FIG. 4 is a diagram which schematically shows an example of a printed material with a list of images.

The coefficient table 380 stores data for generating the output coordinate values $Ci$, $Mi$, and $Yi$ of the actual printing LUT 310 from the output coordinate values $C0i$, $M0i$, and $Y0i$ of the original LUT 300 in response to the adjustment of color. The coefficient table 380 shown in FIG. 3 stores coefficients Act, Amt, and Ayt of CMY for each of test images t. Values of parameters X and Y shown in FIG. 4 are correlated with each of the test images t. When a color corresponding to one test image D3a of the list of images D3 shown in FIG. 1 is set, data needed to generate the output coordinate values $Ci$, $Mi$, and $Yi$ are read from the coefficient table 380 and the output coordinate values $Ci$, $Mi$, and $Yi$ are generated. For example, when $0 < Act \leq 1$, $0 < Amt \leq 1$, $0 \leq Ayt \leq 1$, and a color corresponding to a test image t is set, it is possible to calculate the output coordinate values $Ci$, $Mi$, and $Yi$ by calculation formulas of $Ci = Act \times C0i$, $Mi = Amt \times M0i$, and $Yi = Ayt \times Y0i$. In addition, when a color between a color corresponding to one test image and a color corresponding to another test image is set, for example, a coefficient by which the output coordinate values $C0i$, $M0i$, and Y0i are multiplied is obtained by an interpolation calculation using a plurality of sets of coefficients corresponding to these test images, and the output coordinate values Ci, Mi, and Yi may be calculated.

The coefficients Act, Amt, and Ayt can be set to be greater than 1 according to the output coordinate values C0i, M0i, and Y0i.

However, the printer 1 shown in FIG. 1 includes a list printing control unit U1 for forming the printed material 400 of the list of images D3 as shown in FIG. 4 so as to check a subtle color of a monochrome output image D5 formed in the print substrate 410. The printed material 400 shown in FIG. 4 is made by printing the list of images D3 in which test images D3a having different colors are vertically and horizontally arranged on the print substrate 410. For convenience, an identification number t which is not printed is shown in each of the test images D3a. Values of parameters X and Y corresponding to chromaticity (for example, components a* and b* shown in FIG. 5) are printed under each of the images D3a. Here, a* and b* are color components which configure a CIE L*a*b* color space. A value of the parameter X corresponds to a*, and a value of the parameter Y corresponds to b*.

First, the list printing control unit U1 shown in FIG. 1 generates the list of images before the conversion D2 which is a list of test images D2a having different chromaticities (for example, components a* and b* shown in FIG. 5) based on the input image D1. Each of the images D2a, in the same manner as the input image D1, has pixels aligned in x and y directions, and stores gradation values of RGB in each pixel. In the specific example, a gradation value r of the input image D1 is stored in pixels of the test image D2a as a gradation value of R, and gradation values which represent a color of each of the images D3a in the printed material 400 are stored in pixels of the test image D2a as gradation values of G and B. FIG. 1 shows that a gradation value corresponding to a* is stored as the gradation value of G, and a gradation value corresponding to b* is stored as the gradation value of B. When gradation values r, g1, and b1 are stored in pixels of one test image D2b, and gradation values r, g2, and b2 are stored in pixels of another test image D2c, g1 and g2 are gradation values corresponding to a*, and b1 and b2 are gradation values corresponding to b*.

Each test image D2a of the list of images D2 is preferably reduced from the input image D1 so that a plurality of test images are formed in one print substrate 410. Reduction of the input image D1 can be performed by various image processing methods. For example, when a pixel PX1 is sampled from the input image D1 so as to have m pixel intervals (m is an integer of two or more) in an x direction and n pixel intervals (n is an integer of two or more) in a y direction, a test image D2a which is reduced to 1/m in the x direction and to 1/n in the y direction is generated. In addition, even when a pixel value is averaged in units of m pixels in the x direction and n pixels in the y direction, the test image D2a which is reduced to 1/m in the x direction and 1/n in the y direction is generated. Of course, a gradation value which represents a color is stored in each of the test images D2a.

When the list of images D2 is generated, the list printing control unit U1 performs color conversion on the list of images D2 with reference to the list printing LUT 320 which has a structure different from the actual printing LUT 310. As shown in FIG. 1, each image D3a of the list of images after the conversion D3 has pixels aligned in the x and y directions in the same manner as the list of images D2, but gradation values of CMYKLk are stored in each pixel. FIG. 1 shows that gradation values r, g1, and b1 which are stored in a test image D2b before the conversion are converted into gradation values c1, m1, y1, k, and lk to be stored in a test image D3b, and gradation values r, g2, and b2 stored in another test image D2c are converted into gradation values c2, m2, y2, k, and lk to be stored in a test image D3c.

FIG. 5 schematically shows a structural example of the list printing LUT 320. Specific numerical values shown in the list printing LUT 320 are not more than examples. The list printing LUT 320 specifies a correspondence relationship between input coordinate values Rj, Gj, and Bj and output coordinate values Cj, Mj, Yj, Kj, and LKj with respect to each grid point. A plurality of components which configure an input color system in the list printing LUT 320 include a brightness component 321 corresponding to brightness, and a color component 322 corresponding to color to be adjusted. In the specific example, a gradation value r of the test image D2a corresponds to an input coordinate value Rj of R of the list printing LUT 320, gradation values g1, g2, and so forth of the test image D2a correspond to an input coordinate value Gj of G of the list printing LUT 320, and gradation values b1 and b2, and so forth of the test image D2a correspond to an input coordinate value Bj of B of the list printing LUT 320. That is, the list printing LUT 320 is a three-dimensional data table in which a pseudo-RGB color system is set to be an input color system, an input coordinate value Rj of R is a gradation value corresponding to brightness, an input coordinate value Gj of G is a gradation value corresponding to a*, and an input coordinate value Bj of B is a gradation value corresponding to b*. The output coordinate values Cj, Mj, Yj, Kj, and Lkj are set so that the chromaticities a* and b* corresponding to the input coordinate values Gj and Bj are applied to the test image D3a after the color conversion.

Originally, input coordinate values Rj, Gj, and Bj of RGB in the LUT for monochrome images satisfy Rj=Gj=Bj. In the specific example, roles of the input coordinate values Rj, Gj, and Bj are changed, an input coordinate value Rj is set to be a gradation value corresponding to brightness, and input coordinate values Gj and Bj are set to be gradation values for switching of color adjustment, and thereby the list printing LUT 320 which includes a plurality of simplified actual printing LUTs 310 is created. By creating the list of images before conversion D2 so as to correspond to the list printing LUT 320, the list of images D2 can be collectively color-converted with reference to one list printing LUT 320, a list of images D3 can be printed on the print substrate 410, and thereby fast processing becomes possible.

Since a combination of the input coordinate values Gj and Bj corresponds to color to be adjusted, the list printing LUT 320 can be divided into regions according to the combination of the input coordinate values Gj and Bj. The output coordinate values Cj, Mj, Yj, Kj, and Lkj of each region (for example, regions R1 to R5 shown in FIG. 5) of the list printing LUT 320 can be determined based on the actual printing LUT 310 which is generated with reference to the coefficient table 380 from the original LUT 300.

For example, an output coordinate value of a region R1 of (Gj, Bj)=(0,0) of the list printing LUT 320 can be determined based on the actual printing LUT 310 to which the coefficients Act, Amt, and Ayt that minimize chromaticities a* and b* of an image after the color conversion within an adjustment range are applied. In this case, output coordinate values Ci, Mi, Yi, Ki, and Lki (gradation value G1) corresponding to input coordinate values Ri=Gi=Bi=Rj of N2 points are extracted from the actual printing LUT 310, and these output coordinate values may be set to the output coordinate values Cj, Mj, Yj, Kj, and Lkj of a gradation value G2 (G2<G1). When the obtained output coordinate values Cj, Mj, Yj, Kj, and Lkj are correlated with input coordinate values (Rj, Gj, Bj)=(Rj, 0, 0), the list printing LUT 320 at a portion of the region R1 is generated. Chromaticities a* and b* of an image after the color conversion can be different chromaticities according to brightness.

An output coordinate value of a region R2 of (Gj, Bj)= (0,255) of the list printing LUT 320 can be determined based on the actual printing LUT 310 to which the coefficients Act, Amt, and Ayt that minimize a* of an image after the color conversion within the adjustment range and maximize b* in the adjustment range are applied. Even in this case, the output coordinate values Ci, Mi, Yi, Ki, and Lki corresponding to input coordinate values Ri=Gi=Bi=Rj of N2 points are extracted from the actual printing LUT 310, and these output coordinate values may be set to the output coordinate values Cj, Mj, Yj, Kj, and Lkj of a gradation value G2 (G2<G1). When the obtained output coordinate values Cj, Mj, Yj, Kj, and Lkj are correlated with input coordinate values (Rj, Gj, Bj)=(Rj, 0, 255), the list printing LUT 320 at a portion of the region R2 is generated.

An output coordinate value of a region R3 of (Gj, Bj)= (128, 128) of the list printing LUT 320 can be determined based on the actual printing LUT 310 to which coefficients Act, Amt, and Ayt that set chromaticities a* and b* of an image after the color conversion to be substantially at a center of the adjustment range are applied. An output coordinate value of regions R4 and R5 can be determined in the same manner.

In the manner described above, a correspondence relationship between the input coordinate value Rj and the output coordinate values Cj, Mj, Yj, Kj, and Lkj in the list printing LUT 320 is generated based on a correspondence relationship in each actual printing LUT corresponding to the coefficients Act, Amt, and Ayt.

A three-dimensional list printing LUT 320 has a huge data size when the number N2 of grid points along a coordinate axis of pseudo-RGB is matched to the number N1 of grid points of the actual printing LUT 310. Therefore, the number N2 of grid points is set to be a number (for example, 17) less than N1 and a data size of the list printing LUT 320 is suppressed to reduce a memory size for storing the list printing LUT 320. In a case of the list printing LUT 320 shown in FIG. 5, the grid points along the coordinate axis of RGB are set to be 17 points corresponding to input coordinate values 0, 16, 32, . . . , 224, 240, and 255. Here, an expression that the number of grid points along the coordinate axis of RGB is less than the number N1 of grid points of the actual printing LUT 310 means that the number of grid points along a R axis is less than N1, the number of grid points along a G axis is less than N1, and the number of grid points along a B axis is less than N1.

In addition, the number of gradations G2 of the output coordinate values Cj, Mj, Yj, Kj, and Lkj corresponding to an amount of use of ink in the list printing LUT 320 is set to be a number (for example, 256 which can be represented by 8 bits) less than the number of gradations of the output coordinate values Ci, Mi, Yi, Ki, and Lki of the actual printing LUT 310. This also suppresses a data size of the list printing LUT 320 and reduces a memory size for storing the list printing LUT 320.

Figure 6:
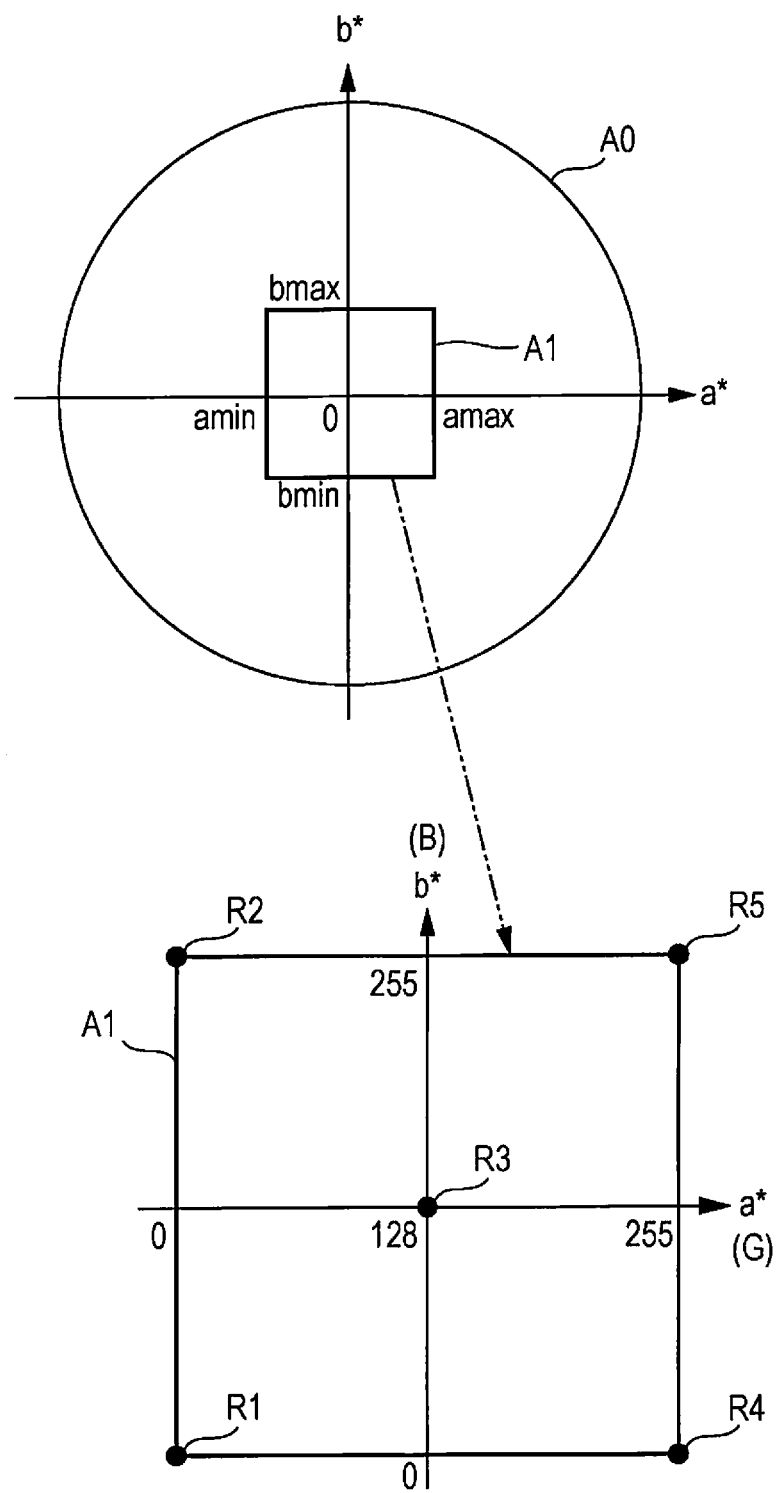
FIG. 6 is a diagram which schematically shows an example of correlating color components with input coordinate values of G and B.

FIG. 6 schematically shows an example in which the color components a* and b* are correlated with the input coordinate values Gj and Bj. Since monochrome images can be expressed by a color in a range close to an achromatic color, it is not necessary to correlate an entire range A0 of chromaticities a* and b* which can be expressed by a chromatic ink of CMY with the input coordinate values Gj and Bj. In an example of FIG. 6, a range A1 of amin≤a*≤amax and bmin≤b*≤bmax among the range A0 is correlated with the input coordinate values Gj and Bj. Here, amin<0, amax>0, bmin<0, and bmax>0 are satisfied, and amin is correlated with Gj=0, amax is correlated with Gj=255, bmin is correlated with Bj=0, and bmax is correlated with Bj=255. At a lower portion of FIG. 6, the range A1 is shown to be enlarged, and positions corresponding to the regions R1 to R5 of the list printing LUT 320 are shown.

Since gradation values of G and B corresponding to chromaticities a* and b* are stored in each test image D2a of the list of images before the conversion D2, the list of images D2 can be collectively color with reference to the three-dimensional list printing LUT 320. Accordingly, list printing control processing is rapidly performed.

When the list of images D2 is color-converted with reference to the list printing LUT 320, the list of printing control units U1 performs control to print the list of images after the conversion D3. Accordingly, the printed material 400 is formed by providing the list of images D3 in which test images D3a having different colors are vertically and horizontally aligned in the print substrate 410. A user of the printer 1 can see the list of images D3 and set a color of an actual output image D5.

3. Printing Control Processing, Operation, and Description of Effects

Figure 7:
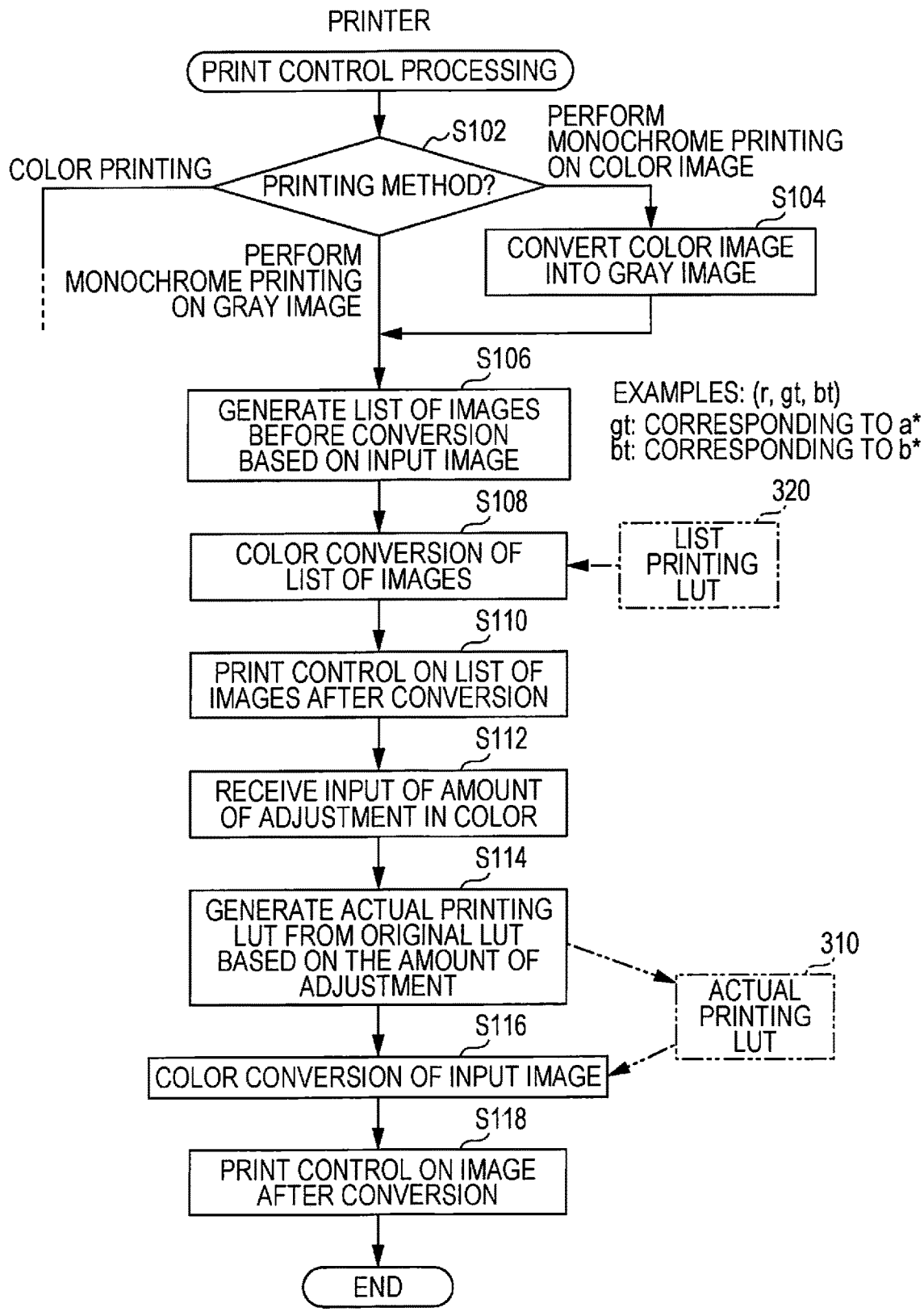
FIG. 7 is a flowchart which shows an example of printing control processing performed by the printer.

FIG. 7 shows an example of printing control processing which includes a printing control method and an image formation method. The processing is performed mainly by the controller 10 of the printer 1 in accordance with a program PRG2. Here, steps S102 to S110 correspond to the list printing control unit U1 and the list image formation unit U2, and steps S112 to S114 correspond to the LUT adjusting unit U3. Hereinafter, a description of the "step" will be omitted. The printing control processing may be realized by an electrical circuit, and may be realized by a program.

For example, when an image recorded in the memory card 90 is selected in the operation panel 73, the printer 1 stores the selected image in the RAM 20, and starts printing control processing. In addition, the printer 1 may start the printing control processing when receiving an image and a printing instruction from the host device 100 to store the image and the printing instruction in the RAM 20.

When the printing control processing is started, the printer 1 converts a resolution of the image stored in the RAM 20 using the resolution conversion unit 41, and causes the processing to branch according to a printing method (S102). For example, when performing color printing on an image such as when color printing is set in the operation panel 73, the printer 1 performs control to color-convert an input image with reference to a color printing LUT which is not shown, and to print the image after the conversion. When performing monochrome printing on an image such as when monochrome printing is set in the operation panel 73, the processing is branched according to whether the image is a color image or a monochrome image. When monochrome printing a color image, the printer 1 converts the color image into a gray image (S104), and the processing proceeds to S106. When a pixel value of the color image is set to be (r0, g0, b0), and a pixel value of the gray image after conversion is set to be (r, g, b), a conversion into the gray image can be performed according to a calculation formula, for example, r=g=b=(r0+g0+b0)/3. When performing monochrome printing on the gray image, the printer 1 advances the processing to S106 as it is.

In S106, the list of images before the conversion D2 is generated based on the gray input image D1 as shown in FIG. 1. For example, the controller 10 reduces the input image D1, arranges the obtained reduced image at a position of each test image D2a, replaces a gradation value of G of each reduced image disposed in a matrix with a gradation value corresponding to a*, and replaces a gradation value of B of each reduced image with a gradation value corresponding to b*. The replaced gradation values of G and B are set to be a value corresponding to a position of the test image D2a. FIG. 1 shows that gradation values r, g1, and b1 are stored in pixels of the test image D2b, and gradation values r, g2, and b2 are stored in pixels of another test image D2c. For example, when a central image of a list of images G2 is generated, the pixel values of G and B are all replaced with 128 according to an input coordinate value (Rj, Gj, Bj)=(Rj, 128, 128) of a region R3 of the list printing LUT 320 shown in FIG. 5. When generating the test image D2a which minimizes chromaticities a* and b* of an image after the color conversion within the adjustment range, the pixel values of G and B are all replaced with 0 according to an input coordinate value (Rj, Gj, Bj)=(Rj, 0, 0) of the region R1. When generating the test image D2a which minimizes a* of the image after the color conversion within the adjustment range and b* of the image after the color conversion within the adjustment range, a pixel value of G is replaced with 0 and a pixel value of B is replaced with 255 according to an input coordinate value (Rj, Gj, Bj)=(Rj, 0, 255) of the region R2.

As described above, the list of images before the conversion D2 that is a list of images D2a having different chromaticities a* and b* is generated.

In S108, the color conversion unit 42 color-converts the list of images D2 with reference to the list printing LUT 320 as shown in FIG. 5. Since a combination of gradation values of G and B stored in each of the test images D2a corresponds to color to be adjusted, a different region of the list printing LUT 320 is referred to for each of the test images D2a. For example, pixel values (r, 128, 128) stored in the test image D2a before the conversion are converted into the gradation values Cj, Mj, Yj, Kj, and Lkj with reference to the region R3 of the list printing LUT 320 shown in FIG. 5. Here, when there is no pixel value r of R in an input coordinate value of R of the list of printing LUT 320, the gradation values Cj, Mj, Yj, Kj, and Lkj after the conversion may be calculated by an interpolation operation using output coordinate values corresponding to input coordinate values of a plurality of R in a vicinity of the pixel value r. The interpolation operation may be one-dimensional interpolation operation, and a linear interpolation may be performed or a non-linear interpolation may be performed.

In S110, the list of images after the conversion D3 is converted into halftone data by the halftone processing unit 43, the halftone data are rearranged by the rasterization processing unit 44, and a drive signal SG corresponding to raster data generated is generated and output to a drive circuit 62 by a drive signal transmission unit 45. Accordingly, control to print the list of images D3 is performed. The mechanism section 50 prints the list of images D3 on the print substrate 410 as shown in FIG. 4 according to the drive signal SG. A value of parameter X corresponding to a* and a value of parameter Y corresponding to b* are given to each of the test images D3a of the list of images D3.

Figure 8:
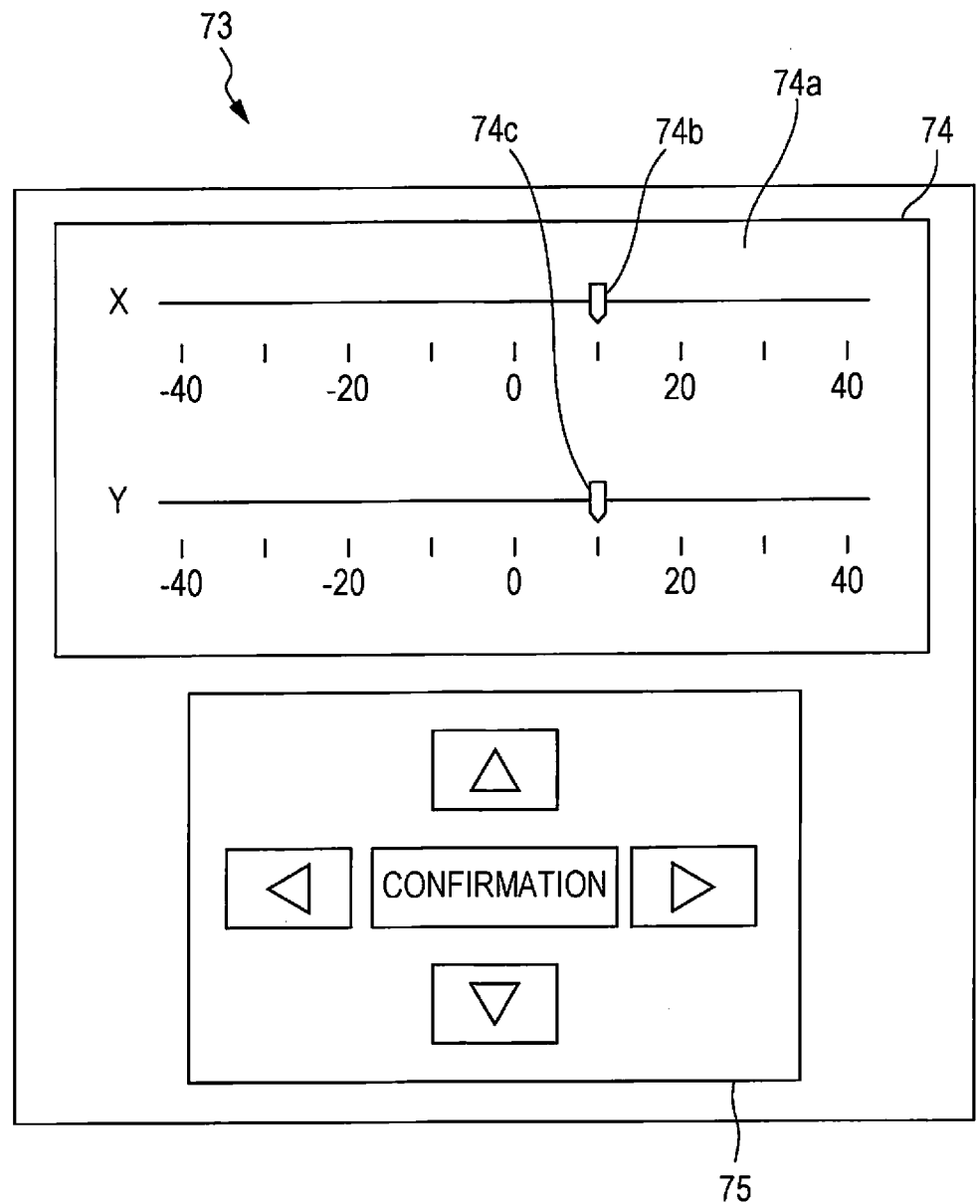
FIG. 8 is a flowchart which schematically shows an example of an operation panel.

In S112, an operation screen 74a is displayed on an output unit 74 as shown in FIG. 8, and the operation panel 73 receives an input of an amount of color adjustment of an output image D5. A slider 74b for setting the value of the parameter X and a slider 74c for setting the value of the parameter Y are provided in the operation screen 74a. The values of the parameters X and Y are equivalent to an amount of color adjustment. The printer 1 receives a key operation of setting positions of the sliders 74b and 74c using the input unit 75, and obtains the values of parameters X and Y corresponding to the set positions. Accordingly, the user inputs the values of parameters X and Y given to the test image D3a of color to print among the list of images D3 of the printed material 400 into the operation panel 73, and thereby it is possible to print the actual output image D5 using a color to print.

The list printing LUT 320 created so as to adjust the actual printing LUT 310 has the number N2 of grid points along a coordinate axis of an input color system less than the number N1 of grid points in the actual printing LUT 310, and has the number G2 of gradations in an amount of ink used less than the number G1 of gradations in an amount of ink used in the actual printing LUT 310. As a result, the list printing LUT 320 cannot be set to be the actual printing LUT 310 as it is. Therefore, an original LUT 300 is adjusted based on an amount of adjustments (values of parameters X and Y) which are input, and the actual printing LUT 310 is generated in the RAM 20 in S114.

The actual printing LUT 310 can be generated with reference to the coefficient table 380 shown in FIG. 3. For example, when X=Xt and Y=Yt corresponding to, for example, test image t are set, the output coordinate values Ci, Mi, Yi, Ki, and Lki of the actual printing LUT 310 can be obtained by (Ci, Mi, Yi, Ki, Lki)=(Act×C0$i$, Amt×M0$i$, Ayt×Y0$i$, K0$i$, Lk0$i$). Moreover, when a coefficient which matches X=Xt and Y=Yt is not stored in the coefficient table 380, a coefficient corresponding to a plurality of sets of parameter values in a vicinity of X=Xt and Y=Yt is calculated by an interpolation operation, and an output coordinate value may be obtained using the obtained coefficient. As a simple example, parameter values Xt and Yt between parameter values X1 and Y1 corresponding to a certain test image (for example, referred to as a test image "1") and parameter values X2 and Y2 corresponding to another test image (for example, referred to as a test image "2") are set. In this case, for example, when a ratio of a distance between parameter values X1 and Y1 and the parameter values Xt and Yt to a distance between the parameter values X1 and Y1 and the parameter values X2 and Y2 on an X-Y plane is displayed as a weight α (0≤α≤1), the output coordinate values Ci, Mi, Yi, Ki, and LKi can be obtained by Ci={(1−a)×Ac1+α×Act}×C0$i$, Mi={(1−α)×Am1+α×Amt}×M0$i$, Yi={(1−α)×Ay1+α×Ay2}×Y0$i$, Ki=K0$i$, and Lki=Lk0$i$.

In S116, the color conversion unit 42 color-converts the input image D1 of the RGB color system with reference to the actual printing LUT 310 described above. Accordingly, input coordinate values Ri=Gi=Bi are converted into the output coordinate values Ci, Mi, Yi, Ki, and Lki, and gradation values r=g=b of each pixel of the input image D1 are converted into gradation values of CMYKLk.

In S118, the image after the color conversion is converted into halftone data by the halftone processing unit 43, the halftone data is rearranged by the rasterization processing unit 44, and a drive signal SG corresponding to raster data generated is generated and output to the drive circuit 62 by the drive signal transmission unit 45. Accordingly, control to print the output image D5 corresponding to the input image D1 is performed. The mechanism section 50 forms the output image D5 in the print substrate 410 as shown in FIG. 5 according to the drive signal SG.

As described above, the list of images D3 which are printed on the print substrate 410 so as to adjust the actual printing LUT 310 is formed based on the list of images after the color conversion which refers to the list printing LUT 320 that has a structure different from the actual printing LUT 310. The list printing LUT 320 in the specific example has the number N2 of grid points along a coordinate axis of an input color system less than the number N1 of grid points in the actual printing LUT 310, and has the number G2 of gradations in an amount of ink used less than the number G1 of gradations in an amount of ink used in the actual printing LUT 3.10. Thus, the technology can allow a memory size required for control processing on a list printing to be reduced.

4. Modification Example

Various modification examples are considered in the invention.

For example, the input color system of LUT may be, in addition to a RGB color system, a CMY color system, an L*a*b* color system, a four-dimensional CMYK color system, and the like. Coloring materials specified in the output coordinate values may include, in addition to CMYKLk, light cyan (Lc), light magenta (Lm), light light black (LLk), dark yellow (Dy), orange (Or), green (Gr), blue (B), violet (V), uncolored coloring material for image quality improvement, and the like. Here, Lc is cyan with a lower concentration than C, Lm is magenta with a lower concentration than M, LLk is an achromatic color with a lower concentration than Lk, and Dy is yellow with a higher concentration than Y. When using Lc and Lm, a coefficient to be used so as to generate an actual printing LUT may be a coefficient multiplied to an output coordinate value of Lc, Lm, and Y in an original LUT. In addition, the technology also includes a case where there is not partial coloring material of CMYKLk.

The list printing LUT may be, in addition to a three-dimensional LUT, a one-dimensional LUT and the like divided according to color.

A brightness component which configures an input color system in the list printing LUT may correspond to an input coordinate value of G or B, in addition to an input coordinate value of R. Of course, as long as not overlapping other components, a a* component may correspond to an input coordinate value of R or B, and a b* component may correspond to an input coordinate value of R or G.

An input image to be color-converted may be not only a gray image but also a color image.

The technology also includes a technology of performing printing control processing on the monochrome image S106 to S118 without performing determination processing in S102 of FIG. 7.

Moreover, in addition to a technology of performing control to print a list of images, the technology also includes a technology (image formation device, image formation method, and the like) of displaying the list of images after the color conversion.

Figure 9:
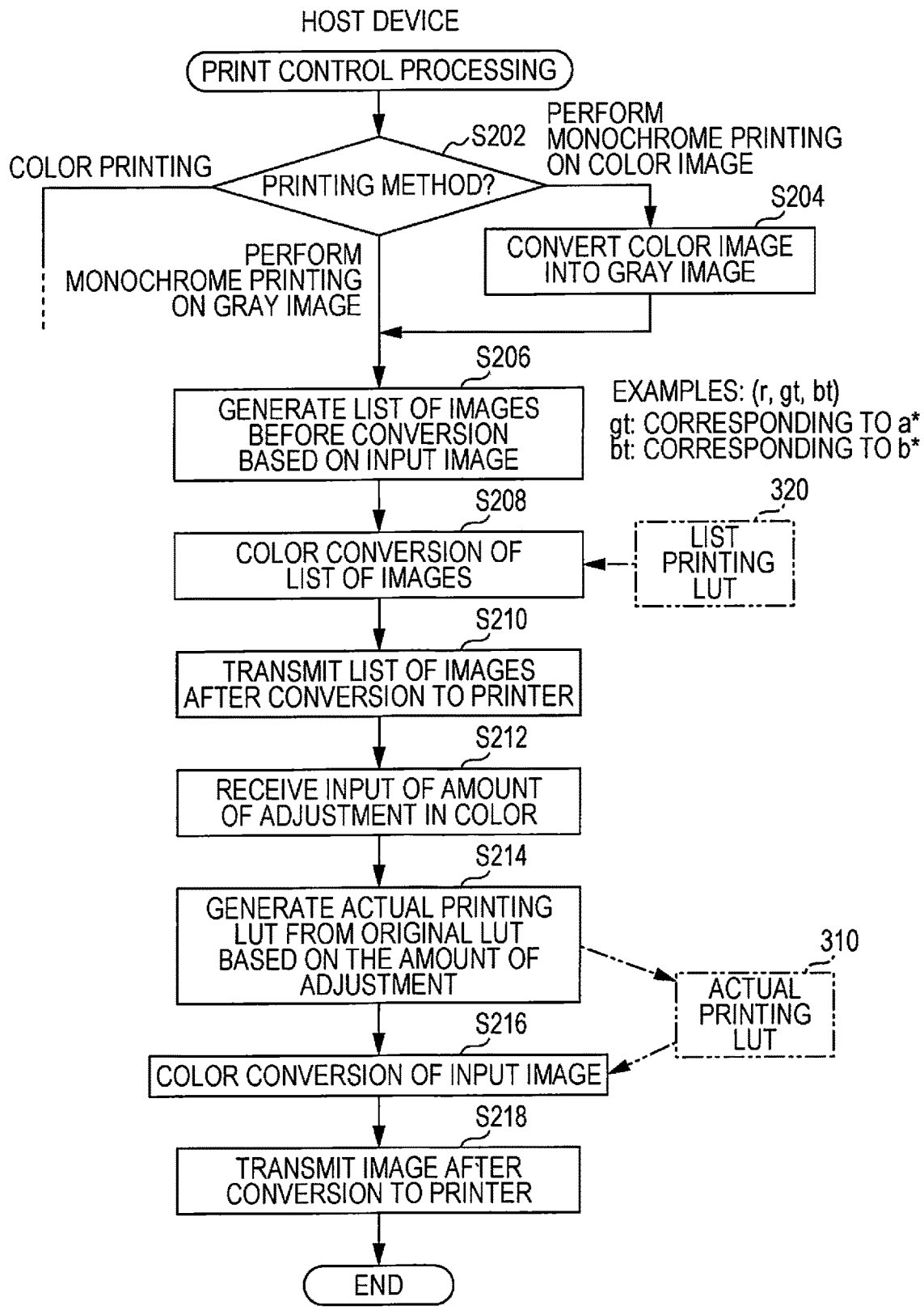
FIG. 9 is a flowchart which shows an example of printing control processing performed by a host device.

The processing described above may be performed not only in a printer, but also in an external device connected to the printer. FIG. 9 shows an example of printing control processing performed by the host device 100. This processing is performed by, for example, an activation of a printer driver installed in the host device 100. For example, when an image to be printed is selected on an image selection screen of an application program which is activated in the host device 100, the host device 100 starts printing control processing.

When the printing control processing is started, the host device 100 causes the processing to branch according to a printing method (S202). For example, when performing color printing on an image such as when setting color printing on a printing setting screen displayed, the host device 100 converts an input image with reference to a color printing LUT which is not shown, and transmits the image after the conversion to the printer 1 to be printed. When performing monochrome printing on an image such as when setting monochrome printing on the printing setting screen, processing is branched according to whether the image is a color image or a monochrome image. When performing monochrome printing on a color image, the host device 100 converts the color image into a gray image (S204), and the processing proceeds to S206.

In S206, the list of images before the conversion D2 is generated based on a gray input image D1 as shown in FIG. 1. In S208, the list of images D2 is color-converted with reference to the list printing LUT 320 as shown in FIG. 5. In S210, the list of images D3 after the conversion is transmitted to the printer 1 to be printed. The printer 1 prints the list of images D3 on the print substrate 410 as shown in FIG. 4 according to the list of images D3 received. The host device 100 may perform halftone processing and may perform rasterization processing.

Figure 10:
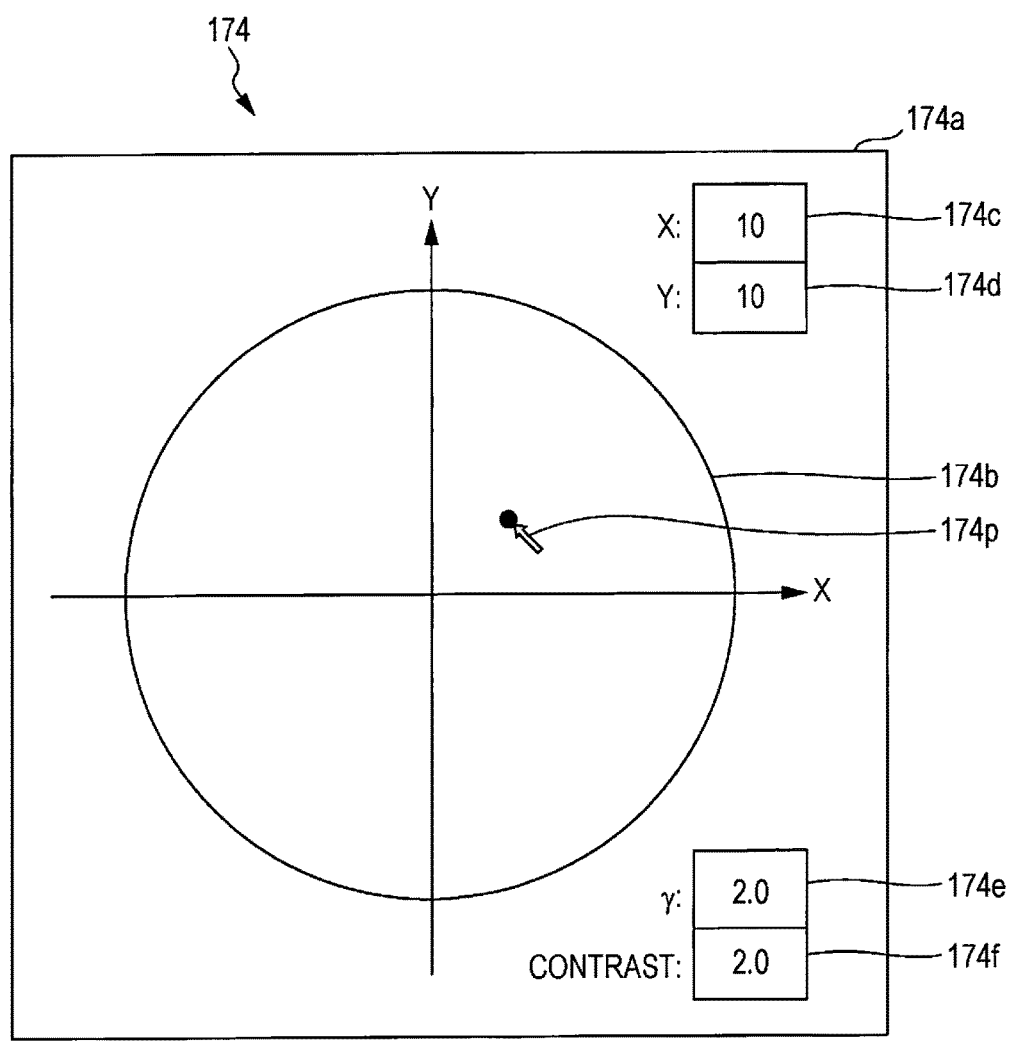
FIG. 10 is a diagram which schematically shows an input screen displayed on a display device.

In S212, an operation screen 174a is displayed on the display device 174 as shown in FIG. 10, and an amount of color adjustment of the output image D5 is input through an input unit (for example, a pointing device and a keyboard) which is not shown. In the operation screen 174a, a color circle 174b on an X-Y plane for setting coordinates of parameters X and Y, an X input field 174c for directly inputting a value of the parameter X, a Y input field 174d for directly inputting a value of the parameter Y, a γ input field 174e for inputting a gamma correction value γ, and a contrast input field 174f for inputting a contrast correction value are provided. The gamma correction value is a parameter for adjusting a brightness of the output image D5. The contrast correction value is a parameter for adjusting a contrast of the output image D5. The gamma correction value and the contrast correction value are reflected in an output coordinate value of the actual printing LUT 310. The host device 100 receives an operation for moving a pointer 174p through the input unit, and calculates values of the parameters X and Y corresponding to a coordinates when the coordinates are set in the color circle 174b to display the values in the input fields 174c and 174d. The host device 100 obtains the values of the parameters X and Y which are displayed in the input fields 174c and 174d or are input. In addition, the host device 100 obtains a gamma correction value γ which is input to the γ input field 174e, and obtains a contrast correction value which is input to the contrast input field 174f. Even if not shown, a preview display of an output image may be performed based on the value of the parameters X and Y, the gamma correction value, and the contrast correction value.

In S214, the original LUT 300 is adjusted based on the amount of adjustment (the values of the parameters X and Y, the gamma correction value, and the contrast correction value) which is input to generate the actual printing LUT 310. Gamma correction and contrast correction can be performed by a well-known method. For example, the gamma correction can be performed by a formula of $Z'=255\times(Z/255)^{(1/\gamma)}$, where an input coordinate value before the correction is Z and an input coordinate value after the correction is Z'. The gamma correction and the contrast correction are performed on output coordinate values C0$i$, M0$i$, Y0$i$, K0$i$, and Lk0$i$ of the original LUT 300, and output coordinate values of CMY among the output coordinate values after the correction C0'$i$, M0'$i$, Y0'$i$, K0'$i$, and Lk0'$i$ are adjusted by a coefficient of the coefficient table 380, and thereby the output coordinate values Ci, Mi, Yi, Ki, and Lki of the actual printing LUT 310 can be obtained.

In S216, the input image D1 of the RGB color system is color-converted with reference to the actual printing LUT 310 described above. In S218, the image after the color conversion is transmitted to the printer 1 to be printed. The printer 1 forms the output image D5 on the print substrate 410 as shown in FIG. 5 according to the received image.

In the modification example, since the list printing LUT 320 which has a structure different from the actual printing LUT 310 is referred to and a list of images for adjusting the actual printing LUT is printed, a memory size required for control processing on list printing can be reduced.

Furthermore, a color component correlated to an input coordinate value of the list printing LUT may be not only a component corresponding to the chromaticities a* and b*, but also may be a component corresponding to gamma characteristics, a component corresponding to a contrast, and the like.

Figure 11:
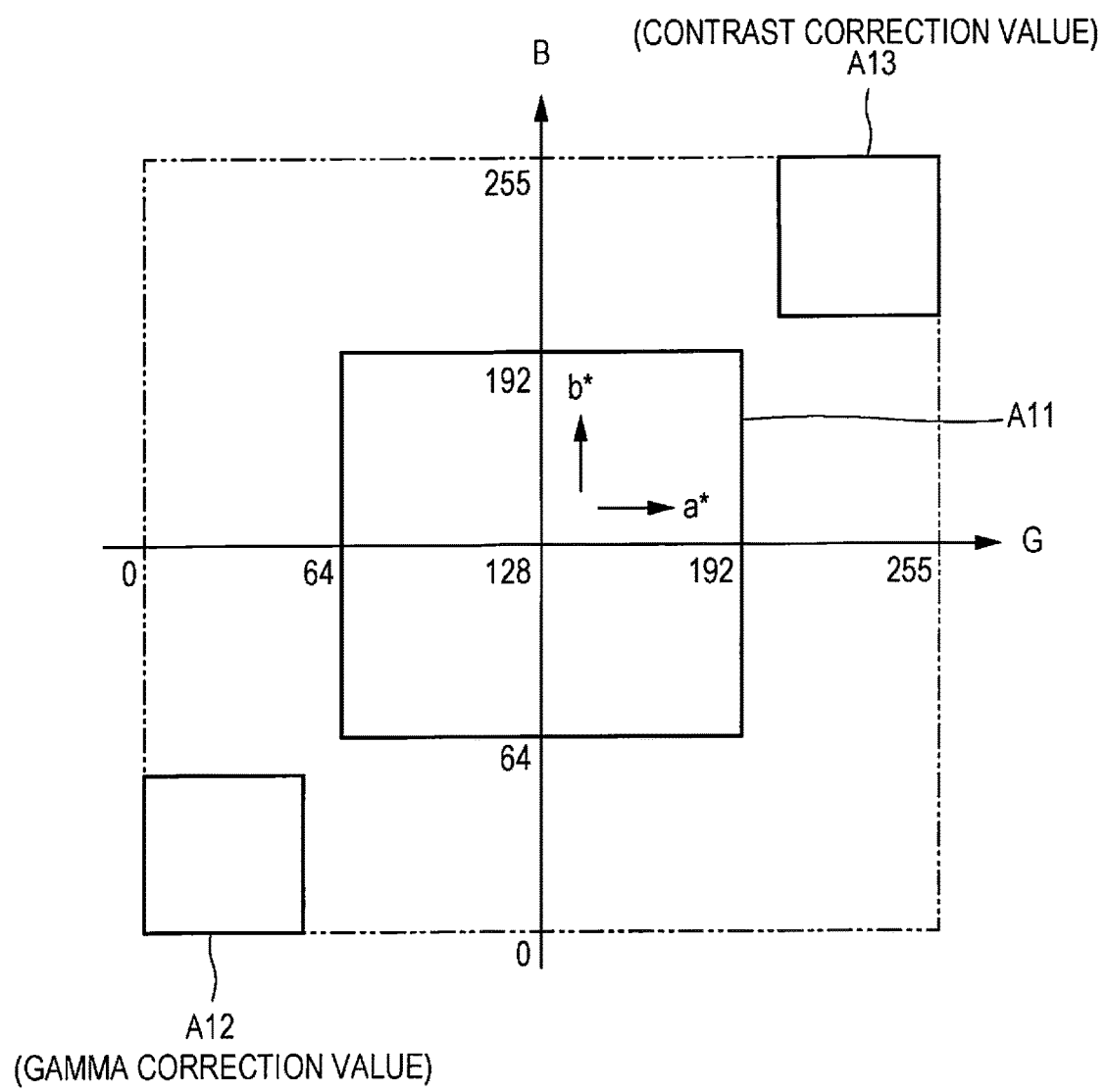
FIG. 11 is a diagram which schematically shows a modification example correlating color components with input coordinate values of G and B.

FIG. 11 schematically shows a modification example which correlates the color component to the input coordinate values of G and B of the list printing LUT 320. In the modification example, the input coordinate values of G and B are in a range A11 from 64 to 192, and the input coordinate values of G and B correspond to the chromaticities a* and b*. Color components other than components corresponding to the chromaticities a* and b* can be correlated to a portion excluding the range A11 from a range from 0 to 255 of the input coordinate values of G and B. For example, all of the input coordinate values of G and B may be correlated to a gamma correction value in a range A12 less than 64, and all of the input coordinate values of G and B may be correlated to a contrast correction value in a range A13 greater than 192.

Output coordinate values Cj, Mj, Yj, Kj, and Lkj of each of the ranges A11 to A13 in the list printing LUT 320 can be determined based on the actual printing LUT 310 generated from the original LUT 300. An output coordinate value of the range A11 can be determined based on the actual printing LUT 310 generated with reference to the coefficient table 380 as shown in FIG. 3 from the original LUT 300. An output coordinate value of the range A12 can be determined based on the actual printing LUT 310 generated by performing the gamma correction on the output coordinate values C0$i$, M0$i$, Y0$i$, K0$i$, and Lk0$i$ of the original LUT 300. An output coordinate value of the range A13 can be determined based on the actual printing LUT 310 generated by performing the contrast correction on the output coordinate values C0$i$, M0$i$, Y0$i$, K0$i$, and Lk0$i$ of the original LUT 300.

When a reduced image of the input image D1 is arranged at apposition of each of the test images D2$a$ as shown in FIG. 1, test images D2$a$ having different chromaticities a* and b* may replace gradation values of G and B of each reduced image in the range A11 with gradation values corresponding to the chromaticies a* and b*. Test images D2$a$ having different gamma correction values may replace gradation values of G and B of each reduced image in the range A12 with gradation values corresponding to gamma correction values. Test images D2$a$ having different contrast correction values may replace gradation values of G and B of each reduced image in the range A13 with gradation values corresponding to contrast correction values. Then, the list of images D2 can be collectively color-converted with reference to the list printing LUT 320 and the list of images D3 can be formed on the print substrate 410 according to the list of images after the conversion D3. A user inputs a value of the parameter assigned to a test image D3$a$ of a color (chromaticity, gamma characteristics, and contrast) to print among the list of images D3, and thereby the actual output image D5 can be printed in the color which the user want to print.

5. Conclusion

As described above, according to the invention, various embodiments can provide a technology and the like which can reduce a memory size to store a list printing color conversion table. Of course, the basic action and effects can be obtained by the technology that does not have configuration requirements according to dependent claims but has only configuration requirements according to independent claims.

In addition, a configuration which has a replacement of each configuration disclosed in the embodiments and the modification example or a change in combinations, a configuration which has a replacement of each configuration disclosed in a well-known technology, and the embodiment and the modification example or a change in combinations, or the like can be also implemented. The invention includes these configurations and the like.

What is claimed is:

1. A printing control device which performs control to convert an input image with reference to a color conversion table that specifies a first correspondence relationship between an input coordinate value and an amount of printing coloring material used and to print an output image into which the input image has been converted, the device comprising:
    a list printing color conversion table that specifies a second correspondence relationship between the input coordinate value and the amount of the printing coloring material used, which is different from the first correspondence relationship of the color conversion table;
    a list printing control unit which performs control to print a list of images with reference to the list printing color conversion table, the list of the images including a plurality of test images of the input image, the test images being arranged in a first direction and a second direction perpendicular to the first direction in the list; and
    the color conversion table in which the amount of the printing coloring material used has been adjusted with reference to the test images which have been printed at the list printing control unit.

2. The printing control device according to claim 1, wherein the number of grid points along a coordinate axis of an input color system in the list printing color conversion table is less than the number of grid points along a coordinate axis of an input color system in the color conversion table.

3. The printing control device according to claim 1, wherein the number of gradations in the amount of coloring material used in the list printing color conversion table is less than the number of gradations in the amount of coloring material used in the color conversion table.

4. The printing control device according to claim 1,
wherein a plurality of components which configure an input color system in the list printing color conversion table include a brightness component corresponding to brightness and a color component corresponding to color to be adjusted, and
the list printing control unit performs control to generate a list of images before the conversion in which the color components are different based on the input image, to convert the list of images before the conversion with reference to the list printing color conversion table, and to print a list of images after the conversion.

5. The printing control device according to claim 1,
wherein a plurality of components which configure an input color system in the list printing color conversion table includes a brightness component corresponding to brightness and a color component corresponding to color to be adjusted, and
a correspondence relationship between the brightness component and the amount of coloring material used is generated based on a correspondence relationship between the brightness component and the amount of coloring material used in the color conversion table.

6. The printing control device according to claim 1, further comprising a color conversion table adjusting unit which receives the amount of adjustment in colors of the output image, and adjusts an original color conversion table that specifies a correspondence relationship between an input coordinate value and the amount of printing coloring material used based on the received amount of adjustment to generate the color conversion table.

7. The printing control device according to claim 1,
wherein an input coordinate value specified in the color conversion table is a value corresponding to brightness, and a coloring material whose amount of use is specified in the color conversion table and the list printing color conversion table includes a chromatic coloring material.

8. The printing control device according to claim 1, further comprising
a color conversion table adjusting unit which adjusts the color conversion table, wherein
the list printing control unit generates the test images of the input image, converts the text images with reference to the list printing color conversion table, and generates the list including the test images that have been converted based on the list printing color conversion table, and the color conversion table adjusting unit adjusts, based on the list, the color conversion table such that the printing control device prints an output image into which the input image is converted based on the color conversion table that has been adjusted.

9. The printing control device according to claim 8, wherein
the test images that have been converted with reference to the list printing color conversion table have chromaticity parameters, respectively, and the chromaticity parameters of the test images are different from each other.

10. The printing control device according to claim 8, wherein
the list printing control unit prints on a medium the test images that have been converted with reference to the list printing color conversion table.

11. The printing control device according to claim 1,
wherein each of the plurality of the test images corresponds to a size-reduced image of the input image.

12. A printing control method which performs control to convert an input image with reference to a color conversion table that specifies a first correspondence relationship between an input coordinate value and the amount of printing coloring material used and to print an output image into which the input image has been converted, the method comprising:
performing control to print a list of images, which includes a plurality of test images of the input image, for adjusting the color conversion table with reference to a list printing color conversion table,
the list printing color conversion table being a table that specifies a second correspondence relationship between the input coordinate value and the amount of the printing coloring material used, which is different from the first correspondence relationship of the color conversion table,
the color conversion table being a table in which the amount of the printing coloring material used has been adjusted with reference to the test images which have been printed,
the test images being arranged in a first direction and a second direction perpendicular to the first direction in the list.

13. The printing control method according to claim 12,
wherein each of the plurality of the test images corresponds to a size-reduced image of the input image.

* * * * *